United States Patent
Hara et al.

(10) Patent No.: US 9,293,154 B2
(45) Date of Patent: *Mar. 22, 2016

(54) SUBSTRATES FOR THIN-FILM MAGNETIC HEADS, MAGNETIC HEAD SLIDERS, AND HARD DISK DRIVE DEVICES

(71) Applicants: NIPPON TUNGSTEN CO., LTD., Fukuoka-shi, Fukuoka (JP); HITACHI METALS, LTD., Minato-ku, Tokyo (JP)

(72) Inventors: Yusuke Hara, Fukuoka (JP); Shinzoh Mitomi, Fukuoka (JP); Shigeru Matsuo, Fukuoka (JP); Hidetaka Sakumichi, Kumagaya (JP)

(73) Assignees: NIPPON TUNGSTEN CO., LTD., Fukuoka (JP); HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,184

(22) Filed: Jun. 26, 2015

(65) Prior Publication Data

US 2015/0380023 A1    Dec. 31, 2015

(30) Foreign Application Priority Data

Jun. 30, 2014  (JP) ................. 2014-134421

(51) Int. Cl.
*G11B 21/21* (2006.01)
*G11B 5/10* (2006.01)
*G11B 5/60* (2006.01)

(52) U.S. Cl.
CPC . *G11B 5/10* (2013.01); *G11B 5/102* (2013.01)

(58) Field of Classification Search
None
See application file for complete search history.

(56) References Cited

U.S. PATENT DOCUMENTS

| 5,595,946 A | 1/1997 | Tsujimoto et al. |
| 6,333,103 B1 * | 12/2001 | Ishii et al. ........... C23C 16/0272 428/701 |
| 7,939,181 B2 * | 5/2011 | Ramm et al. ........ C23C 14/0021 428/701 |
| 2010/0061013 A1 | 3/2010 | Nakazawa et al. |
| 2010/0315743 A1 | 12/2010 | Wang et al. |

FOREIGN PATENT DOCUMENTS

| JP | 02-141467 | 5/1990 |
| JP | 08-034662 | 2/1996 |
| JP | 2008-84520 | 4/2008 |
| JP | 2009-110571 | 5/2009 |
| JP | 2009-120428 | 6/2009 |
| WO | WO 2008-056710 A1 | 5/2008 |

* cited by examiner

*Primary Examiner* — Craig A. Renner
(74) *Attorney, Agent, or Firm* — Nixon Peabody LLP; Jeffrey L. Costellia

(57) ABSTRACT

An AlTiC-based substrate suitable for a thin-film magnetic head is provided. The $Al_2O_3$—TiC based substrate for a thin-film magnetic head including an $Al_2O_3$ phase and a TiC phase, wherein a c-axis lattice constant of the $Al_2O_3$ phase is 12.992 Å or more and 12.998 Å or less, and a lattice constant of the TiC phase is 4.297 Å or more and 4.315 Å or less.

4 Claims, 4 Drawing Sheets

SUBSTRATES FOR THIN-FILM MAGNETIC HEADS, MAGNETIC HEAD SLIDERS, AND HARD DISK DRIVE DEVICES

BACKGROUND OF THE INVENTION

1. Technical Field

The present invention relates to a substrate for a thin-film magnetic head utilized for a magnetic head slider of a hard disk drive device.

2. Description of the Related Art

Recently, the information content of multimedia data is increasing more and more in association with the requirements of higher definition for video and the like. In addition, it is required for the capacity of an information recording device for recording such video to increase. Hard disk drive devices are information recording devices used as data storing devices of personal computers, recording devices connected to television sets, and the like. For such a hard disk drive device, it is required to increase the capacity thereof and to minimize the size thereof.

FIG. 1A schematically shows a thin-film magnetic slider assembly 10 and a disk (a platter) 13 as a magnetic recording medium included in a general hard disk drive device (hereinafter, sometimes referred to as an HDD). As shown in FIG. 1A, a slider 10A held by a gimbal 14 includes a base portion 11 and a reading element and a writing element 12 (hereinafter sometimes simply referred to as a transducer 12) provided on one end portion of the base portion 11. A unit held by the gimbal 14 is referred to as a head slider, or sometimes simply referred to as a slider.

The writing element of the transducer 12 is formed from a magnetic material. A coil is wound on the inside of a ring, and a magnetic field is generated in the writing element by applying a recording signal to the coil. In this way, data is written onto a disk 13. On the other hand, the reading element as a reproducing head is a magneto-resistive (MR or GMR) effect element, a tunneling magneto-resistive (TMR) effect element, or the like for converting the variation in magnetic field into the variation of electric resistance. The reading element reads magnetic data recorded on the disk 13, and converts the data into electric signals.

The substrate 11 for holding the transducer 12 was often formed by an $Al_2O_3$—TiC-based ceramic sintered body. This is because $Al_2O_3$—TiC (hereinafter abbreviated to AlTiC) is superior and well-balanced in respect of the thermal property, the mechanical property, and the workability.

In order to increase the storage capacity of HDD, it is required to increase the recording density of the disk 13. Currently, the recording density of HDD reaches about 750 Gbit/square inch. In order to accurately realize the writing/reading operation in such a situation of high recording density, the gap between the transducer 12 and the disk 13 during the operation is preferably small. At present, the gap is as small as 10 nm or less.

In association with the smaller size and higher capacity of a hard disk drive device, the floating height of the thin-film magnetic head from the disk is low, and a higher degree of surface roughness is required for the air bearing surface (ABS) 11a of the slider of the thin-film magnetic head. The ABS 11a is a surface of the base portion 11 facing to the disk 13 in the slider. The shape thereof is designed such as that the ABS 11a is caused to stably float by an appropriate distance from a disk surface due to air flow generated by the rotation of the disk 13 (see, FIG. 1B).

In order to realize the desired shape of the ABS, the base portion 11 is required to have a property to be accurately worked at a nano-level. In general, the base portion 11 is first worked to be flat via a lapping step (a grinding step with a lapping apparatus), and then worked to have the shape with which the above-mentioned air flow can be appropriately utilized by using a dry etching method such as ion milling, ion beam etching, or other methods. In the condition after the above-mentioned lapping step, the worked surface of the base portion 11 is preferably an extremely smooth flat plane.

The gap between the disk 13 and the transducer 12 during the operation may be varied by a factor other than the smoothness of the base portion 11. Hereinafter such a factor will be exemplarily described.

As shown in FIG. 2A and FIG. 2B, the thin-film magnetic head (the slider) 20 is formed by laminating, for example, an AlTiC substrate (the base portion) 21, an $Al_2O_3$ film 22, a transducer 23, and an $Al_2O_3$ film 24. The $Al_2O_3$ films 22 and 24 are typically amorphous alumina. When a thin-film magnetic head 20 is manufactured, a plane 25 which will be an ABS (corresponding to the cut-out plane obtained by cutting the substrate 21 having a thickness t into rod-like bodies 21' as shown in the lower right portion of FIG. 2B) is first polished to be flat. The plane 25 which will be the ABS (hereinafter referred to as an ABS forming plane) corresponds to a sectional plane of the lamination including the AlTiC substrate 21, the $Al_2O_3$ films 22 and 24, and the transducer 23.

In the ABS forming plane 25, since the AlTiC substrate 21, the $Al_2O_3$ films 22 and 24, and the transducer are exposed, the difference in hardness among these elements becomes a problem when the ABS forming plane 25 is polished. The Vickers hardnesses Hv of the $Al_2O_3$ phase and the TiC phase of the AlTiC substrate 21 are 2000 or more, respectively. The Vickers hardnesses Hv of the amorphous $Al_2O_3$ films 22 and 24, and the transducer 23 (metal) are 700 to 900, and 100 to 300, respectively.

Accordingly, if the ABS forming plane 25 is polished so that the polishing amount of the surface of the AlTiC substrate 21 (especially TiC phase) as the main constituting portion of ABS is optimum, the $Al_2O_3$ films 22 and 24, and the transducer 23 having the lower hardnesses than the TiC phase are excessively polished. As a result, in the ABS forming plane 25 which is to be flat, the portion corresponding to the $Al_2O_3$ films 22 and 24 is lower than the portion corresponding to the AlTiC substrate 21, and the portion corresponding to the transducer 23 is disadvantageously further lower than the portion.

Generally, the step difference is referred to as a pole tip recession (hereinafter abbreviated to "PTR"). Due to the generation of the PTR, an extra gap is formed between the transducer and the magnetic recording medium. This may prevent the increase in recording density and the increase of capacity of the hard disk drive.

As described above, in order to increase the recoding density of HDD, it is required that the distance between the slider and the disk during the operation is controlled as precisely as possible. For example, WO2008/056710 describes a technique in which the organization of an AlTiC substrate manufactured as a sintered body is appropriately formed, so that the mechanical workability can be improved. When an AlTiC substrate with such superior workability is used, a magnetic head with high shape accuracy can be manufactured. Thus, the floating amount of the magnetic head with respect to the disk can be controlled with high accuracy.

One of planes of a slider base portion formed from an AlTiC substrate is subjected to dry etching such as ion beam etching or RIE (reactive ion etching) so as to have the shape of ABS. In the dry etching step, if there are phases of which the etching rates are different, there may sometimes arise a problem that the surface roughness after the dry etching is drastically deteriorated. For example, even if the etching amounts of the $Al_2O_3$ phase and the TiC phase included in the AlTiC substrate can be uniform, in the case where an $Al_2TiO_5$ phase (an aluminum titanate phase) is generated as a third phase, the etching amount is not uniform. As a result, the surface roughness after the dry etching is sometimes drastically deteriorated.

The AlTiC substrate constituting the base portion of the slider is made from composite ceramic material including the $Al_2O_3$ phase and the TiC phase. For this reason, there arise various problems because of the difference in properties of the two phases. As described above, both of the $Al_2O_3$ phase and the TiC phase have very hard characteristics, but in more detail, in the AlTiC substrate, the TiC phase is harder than the $Al_2O_3$ phase. Thus, there is a difference in hardness between the two phases. Accordingly, when the AlTiC substrate is subjected to lapping, the $Al_2O_3$ phase is more ground than the TiC phase. As a result, a step difference (concave and convex) may be sometimes caused in the surface of the AlTiC substrate after the lapping (hereinafter, sometimes referred to as a lapped surface or a lapping worked surface). When the smoothness of the surface of the AlTiC substrate is degraded, the control of air flow between the head and the disk is unstable. As a result, the designed floating amount of the head cannot be obtained, or the floating amount is disadvantageously unstable.

High shape accuracy is required, and additionally in order to increase the productivity of the slider, it is desired that the mechanical workability of the AlTiC substrate should be also good. More specifically, in the manufacturing process of a slider, as shown in FIG. 2B, a disk-like AlTiC substrate 21 is cut into rod-like bodies (row bars) 21' by using a dicing saw or the like. It is preferred that the cutting step is efficiently performed. The cut surface of the obtained rod-like body is subjected to lapping (polished), and it is preferred that the efficiency of the lapping step (lapping rate) should be increased. Therefore, an AlTiC substrate which can realize sufficient device properties and which has good cutting workability and lapping rate is desired.

As described above, for the AlTiC substrate for the thin-film magnetic head, various characteristics are required. In a head slider of which miniaturization is further advanced, especially, an AlTiC substrate with good cutting workability and lapping rate, and by which the productivity can be improved is required. Not only superior productivity, but also the smoothness of the lapping worked surface of the AlTiC substrate is required.

The present invention has been conducted in view of the above-mentioned problems, and the objective thereof is to provide an AlTiC-based substrate for a thin-film magnetic head of which the productivity is high and of which the lapping worked surface has good smoothness, and to provide a slider and an HDD utilizing the substrate.

SUMMARY OF THE INVENTION

An $Al_2O_3$—TiC based substrate for a thin-film magnetic head in one embodiment of the present invention includes an $Al_2O_3$ phase and a TiC phase, wherein a c-axis lattice constant of the $Al_2O_3$ phase is 12.992 Å (1.2992 nm) or more and 12.998 Å (1.2998 nm) or less, and a lattice constant of the TiC phase is 4.297 Å (0.4297 nm) or more and 4.315 Å (0.4315 nm) or less.

In one embodiment, the c-axis lattice constant of the $Al_2O_3$ phase is 12.992 Å (1.2992 nm) or more and 12.996 Å (1.2996 nm) or less, and the lattice constant of the TiC phase is 4.297 Å (0.4297 nm) or more and 4.310 Å (0.4310 nm) or less.

A magnetic head slider in one embodiment of the present invention is configured by utilizing one of the above-mentioned $Al_2O_3$—TiC based substrates for a thin-film magnetic head.

A hard disk drive device in one embodiment of the present invention is provided with the above-mentioned magnetic head slider.

The substrate for the thin-film magnetic head according to the present invention has good cutting workability, so that it can be manufactured with high productivity. In addition, the smoothness of the lapping worked surface after the lapping step is good. Thus, it is possible to obtain a magnetic head slider of which the floating amount from a disk can easily be controlled and a HDD with larger capacity with high productivity.

BRIEF DESCRIPTION OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

DETAILED DESCRIPTION OF PREFERRED EMBODIMENTS

Hereinafter, preferred embodiments of the present invention will be described with reference to the accompanying drawings. However, the present invention is not limited to those described below.

A substrate for a thin-film magnetic head according to an embodiment of the present invention is an $Al_2O_3$—TiC-based substrate (hereinafter referred to as an AlTiC substrate) including an $Al_2O_3$ phase and a TiC phase. In the AlTiC substrate of this embodiment, typically, the $Al_2O_3$ phase constitutes a matrix phase, and an organization in which the TiC phase is dispersed in the $Al_2O_3$ matrix phase is formed.

Herein the $Al_2O_3$ phase is a phase constituted by an $Al_2O_3$ crystal and a crystal in which other element is substituted for part of elements constituting the $Al_2O_3$ crystal. The TiC phase is a phase constituted by a TiC crystal and a crystal in which other element is substituted for part of elements constituting the TiC crystal.

It is noted that the $Al_2O_3$ phase and the TiC phase can be easily identified, for example, by observation with an optical microscope or SEM (scanning electron microscope). In the thus-identified $Al_2O_3$ phase and the TiC phase, a c-axis lattice constant of the $Al_2O_3$ phase and a lattice constant of the TiC phase are obtained by using X-ray diffraction as described later.

Herein in the substrate for the thin-film magnetic head of this embodiment, the c-axis lattice constant of the $Al_2O_3$ phase is set to be 12.992 Å or more and 12.998 Å or less. The $Al_2O_3$ (aluminum oxide (III)) may sometimes be referred to as alumina ($\alpha$-alumina) in general. Also in this specification, $Al_2O_3$ may sometimes be referred to as alumina.

In this specification, the lattice constants of the alumina phase and the TiC phase may not necessarily be completely uniform in the AlTiC substrate, but may be slightly different depending on measured points. In such a case, an average of values obtained by the measurements of several or more different points of the substrate may be regarded as a lattice constant in the AlTiC substrate.

Figure 3A:
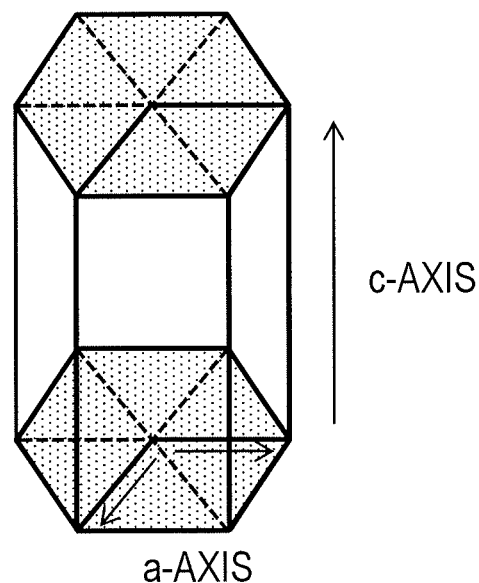
FIG. 3A is a perspective view of a crystal structure of alumina.
Figure 3B:
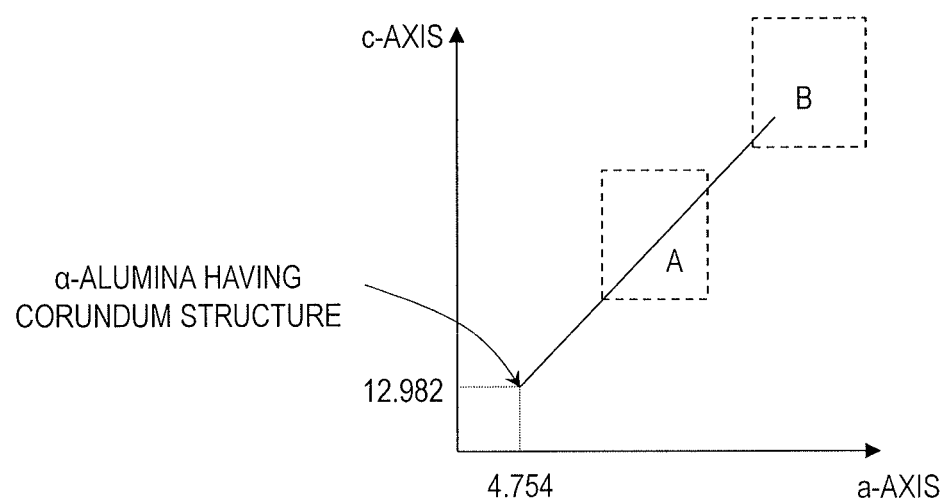
FIG. 3B is a graph showing lattice constants (a-axis and c-axis) of reference data of α-alumina (Region A: powder condition used as a material, and Region B: an $Al_2O_3$ phase in the condition after the sintering of AlTiC), respectively.

The lattice constant of the alumina phase will be described below. The alumina crystal has a crystal structure of trigonal system. As shown in FIG. 3A, the crystal structure approximates pseudo hexagonal crystal, so that lattice constants can be shown along a-axis and c-axis. As shown in FIG. 3B, it is known that in the $\alpha$-alumina having a corundum structure, the a-axis lattice constant is 4.754 Å, and the c-axis lattice constant is 12.982 Å.

As shown as the region A of FIG. 3B, in the alumina material powder for manufacturing the AlTiC substrate, the a-axis and c-axis lattice constants are larger, respectively. It is considered that this is a phenomena which occurs due to remaining impurity elements such as Na, Mg, and Ca other than Al and O in the process of producing the alumina material powder from mineral ore. The atomic radii of such elements are larger than that of Al, so that as the impurity elements are more substituted, the size of crystal lattice tends to increase.

In some cases, the AlTiC substrate may be manufactured with higher sintering property by performing the sintering step while adding MgO, $Y_2O_3$, or the like as sintering aid to alumina and TiC in material powder condition, which will be described later. When the sintering aid is added in such a way, some other element is substituted for part of Al atoms in the sintering step. As a result, in the manufactured AlTiC substrate, the lattice constants along a-axis and c-axis of the $Al_2O_3$ phase in the AlTiC substrate may sometimes be much larger, as shown in the region B of FIG. 3B.

As described above, the lattice constant of the $Al_2O_3$ phase in the AlTiC substrate may be varied depending on various factors in the production process. Thus, the inventors of this invention focused on the c-axis lattice constant of the $Al_2O_3$ phase which has not been examined, and earnestly performed experiments and investigation about the influence of the c-axis lattice constant of the $Al_2O_3$ phase on the cutting workability and the lapping rate in the AlTiC substrate utilized as a magnetic head slider. In addition, the inventors of this invention focused on the lattice constant of the TiC phase, and earnestly performed experiments and investigation about the influence of the combination with the c-axis lattice constant of the $Al_2O_3$ phase on the cutting workability and the lapping rate of the AlTiC substrate.

As a result, as described above, it was found that when the c-axis lattice constant of the $Al_2O_3$ phase was set in the range of 12.992 Å or more and 12.998 Å or less, and the lattice constant of the TiC phase was set to be 4.297 Å or more and 4.315 Å or less, the cutting workability and the lapping rate could be increased, and the productivity could be improved. In addition, it was found that if the c-axis lattice constant of the $Al_2O_3$ phase and the lattice constant of the TiC phase were set in the above-mentioned ranges, respectively, the surface roughness of the lapping worked surface after the lapping step could be reduced, and an AlTiC substrate for a magnetic head slider with high shape accuracy could be obtained. Herein the TiC crystal is an NaCl-type crystal (cubic system), and lattice constants in respective directions in the crystal have the same value (i.e. a value represented as an a-axis lattice constant.) In this specification, the lattice constant of the TiC phase indicates the above-mentioned value.

Herein the cutting workability indicates the easiness of cutting work when the AlTiC substrate is cut into row bars or chips. The cutting workability can be, for example, evaluated by the cutting number of row bars which can be cut until the resistance value in the cutting reaches a predetermined value. The larger cutting number means the higher productivity.

The lapping rate means a polishing amount per unit period of time ($\mu$m/min) in the polishing step performed by using a lapping apparatus. In the case where the workability of the object to be worked is good, the lapping rate increases and hence the productivity is improved.

The surface roughness (smoothness) of the lapping worked surface can be represented by an average roughness Ra (nm) (in the present specification, it indicates an arithmetic average roughness Ra defined by Japanese Industrial Standard (JIS) Nos. JIS B 0601:1944 and JIS B 0031:1994). The smaller value of the average roughness Ra (nm) means the higher smoothness of the lapping worked surface.

As described above, by appropriately setting both of the c-axis lattice constant of the alumina phase and the lattice constant of the TiC phase in the AlTiC substrate, the mechanical workability (the cutting workability and the lapping rate) can be improved, and the shape of the lapping worked surface can be smooth.

It is considered that the reason why the mechanical workability is improved in such a way is that relatively large amount of elements other than Al nor 0 are contained in the $Al_2O_3$ phase of the AlTiC substrate, and hence strains are generated in the $Al_2O_3$ phase, so that cracks are easily progressed. As a result, the working can be promoted in the cutting step and the lapping step. In addition, it is considered that the reason is that the TiC phase of the AlTiC substrate contains relatively large amount of O or N, and hence cracks are generated in the TiC phase, so that the mechanical workability is promoted.

When the cutting workability was particularly examined, it was confirmed that in the case where the lattice constant of the TiC phase was in the range of 4.297 Å or more and 4.315 Å or less, the number of row bars which could be cut until the cutting resistance value reached the predetermined value was sufficient, even when the c-axis lattice constant of the $Al_2O_3$ phase was 12.998 Å or more and 13.006 Å or less which was larger than the above-mentioned range. Accordingly, in the case where the cutting workability is the main factor to be considered, the c-axis lattice constant of the $Al_2O_3$ phase may be set in the wider range of 12.992 Å or more and 13.006 Å or less, in so far as the lattice constant of the TiC phase is 4.297 Å or more and 4.315 Å or less.

From the viewpoint of improving the smoothness of the lapping worked surface, it was found that the lattice constant of the TiC phase was more preferably 4.311 Å or less, and further more preferably 4.310 Å or less. This is because the difference in the polishing rate between the $Al_2O_3$ and the TiC phase can be reduced since the lattice constant of the TiC phase is relatively low and the TiC phase is easily polished. As the difference in the polishing rate between the $Al_2O_3$ phase and the TiC phase is smaller, the worked surface after the lapping step is smoother.

For the same reason, if the c-axis lattice constant of the $Al_2O_3$ phase is relatively low (that is, close to 12.982 Å which is the c-axis lattice constant of α-alumina having the corundum structure, so that it is difficult to be polished), the smoothness of the lapping worked surface is more easily improved. From this point of view, the c-axis lattice constant of the $Al_2O_3$ phase is preferably 12.996 Å or less, and more preferably 12.995 Å or less.

As described above, in the substrate for the thin-film magnetic head of the present embodiment, the lattice constant of the TiC phase in the AlTiC substrate is set in the range of 4.297 Å or more and 4.315 Å or less. Herein the TiC phase may have the composition ratio from $TiC_{0.5}$ to $TiC_{1.0}$. As the amount of C with respect to Ti is smaller, the lattice constant of the TiC phase tends to decrease. If O (oxygen) and/or N (nitrogen) is substituted for part of C of the TiC phase, the lattice constant is lowered. It is noted that, in the TiC phase closer to the stoichiometric ratio (TiC material powder which can be practically available and of which the atomic ratio of C to Ti is about 0.95), the lattice constant is approximately from 4.327 Å or more to 4.330 Å or less.

In order to set the lattice constant of the TiC phase in the AlTiC substrate in the range of 4.297 Å or more and 4.315 Å or less, for example, it is sufficient to select a material powder of which the atomic ratio of C to Ti is less than 1.0 and which has the atomic ratio in the predetermined range. Alternatively, the amount of $TiO_2$ (or $TiO_x$ (x is 0.5 or more and less than 1), $Ti_2O_3$, $Ti_3O_5$ and the like) or TiN used as an additive is regulated, thereby setting the lattice constant of TiC phase in an appropriate range. In addition, by appropriately regulating the oxygen partial pressure and the nitrogen partial pressure in the sintering atmosphere, it is possible to adjust the lattice constant of the TiC phase.

Herein the range of 4.297 Å or more and 4.315 Å or less of the lattice constant of the TiC phase in the AlTiC substrate is relatively different from the lattice constant (about 4.327 Å to 4.330 Å) in the TiC phase closer to the stoichiometric ratio. In order to set the lattice constant of the TiC phase in such a range in the AlTiC substrate, for example, the TiC material powder having a relatively small atomic ratio of C to Ti may be used. Specifically, a material powder of nearly $TiC_{0.50}$ to $TiC_{0.85}$ may be used. Alternatively, it is sufficient to use an increased amount of additive such as $TiO_2$ based or TiN (for example, the additive is about 12 to 35 mass % with the total content of the TiC powder and the additive as 100 mass %).

Alternatively, a method in which the amount of oxygen taken from water, air, or the like is increased in the steps of mixing, grinding, drying, or granulation of material powders, or a method in which the amount of nitrogen or the amount of oxygen is increased with the $N_2$ partial pressure or the $O_2$ partial pressure in the range of 13 kPa to 90 kPa, for example, in the atmosphere of sintering may be utilized. For example, oxygen can be introduced by performing the initial stage of the sintering step in the atmosphere containing oxygen. Moreover, a step of reducing the lattice constant of the TiC phase may be separately added. For example, the mixed powder or a compact (pressurized powder body) is subjected to thermal treatment in the atmosphere containing oxygen, so that oxygen may be introduced to the surface of the TiC material powder or the compact. Alternatively, a method in which the amount of oxygen introduced to the surface of the TiC material powder by increasing the stress applied in the steps of grinding and mixing of the material powder may be adopted.

The cutting workability can be controlled by varying the ratio between the $Al_2O_3$ phase and the TiC phase in the sintered body. Specifically, the ratio of the TiC phase in the sintered body is made to be relatively large, thereby improving the cutting workability.

In this embodiment, in order to increasing the productivity by improving the cutting workability and the lapping rate, and to make the smoothness of the lapping worked surface to be good, it is sufficient that the ratio between the alumina phase and the TiC phase after sintering be in an appropriate range. For this purpose, in the stage of the mixed powder for sintering, such a mass ratio is preferred that the total amount of the material powder used for forming the TiC phase (for example, TiC powder and $TiO_2$ powder) is 25 to 50 mass % of the total, and the balance is made up of the material powder for forming the alumina phase (for example, alumina powder). In more preferred mass ratio, the total amount of the material powder for forming the TiC phase is 30 to 50 mass % of the total.

In order to form the ABS on the obtained AlTiC substrate, dry etching such as ion milling or ion beam etching is performed. It was confirmed that, in the case where the c-axis lattice constant of the $Al_2O_3$ phase was 12.992 Å or more and 12.998 Å or less, and the lattice constant of TiC phase was 4.297 Å or more and 4.315 Å or less as described above, a phase with a different etching rate was hardly generated and the degradation of surface roughness after dry etching could be prevented.

Hereinafter the production method of the AlTiC substrate in the embodiment according to the present invention will be described.

First, alumina powder, TiC powder, and $TiO_2$ powder are prepared as material powders. The respective material powders are ground so as to have desired average particle sizes by using a ball mill or the like. For example, respective average particle sizes of the alumina powder, the TiC powder, and the $TiO_2$ powder are 0.2 to 0.6 μm, 0.02 to 1.0 μm, and 0.02 to 0.2 μm. In this specification, the term "average particle size" means the d50 average particle size (the median diameter at 50% in the cumulative distribution) obtained by the laser diffraction.

Alternatively, the grinding step is not performed individually for each powder, but the mixing and the grinding may be performed simultaneously. The mixing and grinding step can be performed by using a vibration mill, a colloid mill, an Attritor, a high speed mixer, or the like, instead of the ball mill.

It is preferred that, in order to reduce the lattice constant of the TiC phase after the sintering, the amount of oxygen to be taken in the TiC material powder be increased. However, in the mixing and grinding step, as the number of revolution of the mill to be employed becomes higher, and as the period of time for grinding becomes longer, the grinding of the TiC powder is progressed, and the surface oxidation proceeds. Accordingly, the amount of oxygen introduced by the oxidation of the surface of the TiC material powder can be increased. Thus, the oxygen dissolved in the TiC crystal lattice during the sintering is increased, thereby lowering the lattice constant in the TiC phase after sintering.

The reason why the average particle size of the alumina powder is set in the range of 0.2 μm to 0.6 μm is that if it is less than 0.2 μm, the formability is degraded, so that there is a possibility that the sintering step may not be appropriately performed. In addition, if the average particle size thereof exceeds 0.6 μm, the densification of the sintered body is not sufficient, so that there is a possibility that the strength may be insufficient.

The reason why the average particle size of the TiC powder is set in the range of 0.02 µm to 1.0 µm is that if it is less than 0.02 µm, the formability is liable to be degraded, so that there is a possibility that the sintering step may not be appropriately performed. In addition, if the average particle size thereof exceeds 1.0 µm, the sintering property is degraded, so that there is a possibility that a dense sintered body may not be obtained.

The reason why the average particle size of the TiO$_2$ powder is set in the range of 0.02 µm to 0.2 µm is that if it is less than 0.02 µm, the powder is liable to be aggregated. In addition, if the average particle size thereof exceeds 0.2 µm, the function for promoting the sintering step is deteriorated, so that it is difficult to obtain a dense sintered body.

Next, the respective powders are mixed at a predetermined ratio, and a slurry is formed by wet milling, for example. The slurry is dried, thereby obtaining mixed powder for sintering. Herein in the mixed powder for sintering, when the total mass of the Al$_2$O$_3$ powder, the TiC powder, and TiO$_2$ powder is regarded as 100 mass %, the mass % of the Al$_2$O$_3$ powder is 50 mass % or more and 75 mass % or less, for example. The total mass % of the TiC powder and the TiO$_2$ powder is 25 mass % or more and 50 mass % or less, for example. If the total mass of the TiC powder and the TiO$_2$ powder is regarded as 100 pts·mass, the mass ratio of the TiC powder is 70 pts·mass or more and 90 pts·mass or less, for example. The mass ratio of the TiO$_2$ powder is 10 pts·mass or more and 30 pts·mass or less, for example.

In the obtained AlTiC substrate, if the hardness of the TiC phase is larger than the hardness of the alumina phase, the smoothness of the lapping worked surface is degraded. In order to prevent the degradation, it is preferred that the amount of TiO$_2$ powder is relatively larger than the amount of TiC powder in the stage of the material powder. Accordingly, from the viewpoint of the smoothness of the lapping worked surface, it is preferred that the TiO$_2$ powder is 11 pts·mass or more (the balance is the TiC powder) with the total content of the TiC powder and the TiO$_2$ powder as 100 pts·mass.

In the case where a powder material for forming the TiC phase after sintering (for example, TiN powder) is used in addition to the above-mentioned TiC powder and the TiO$_2$ powder, the total mass of the powder material for forming the TiC phase may be in the range of 25 mass % or more and 50 mass % or less with respect to 100 mass % as the total with the Al$_2$O$_2$ powder.

In the above-described mixing step, MgO, Y$_2$O$_2$, or the like used as a sintering aid may be added. The amount of the sintering aids may affect the c-axis lattice constant of the alumina phase after the sintering. In this embodiment, the amount of sintering aids may be, for example, 500 ppm to 1000 ppm or less, or alternatively be 500 ppm to 700 ppm with the content other than sintering aids as 100 mass %.

Next, by using a spray dryer, a compression granulator, an extrusion granulator, or the like, the mixed powder for sintering is granulated. Then the granulated mixed powder for sintering is compacted with a die, thereby obtaining a compact (pressurized powder body). Alternatively, the above-granulated mixed powder for sintering may be molded by utilizing dry pressure molding or cold isostatic hydro-pressure molding, thereby obtaining a compact.

The compact is subjected to, for example, hot-press sintering, or normal pressure sintering or atmospheric pressure sintering in non-oxidative atmosphere, thereby obtaining an AlTiC substrate as a sintered body. In addition to these steps, hot isostatic pressing (HIP) process may be added.

In the case of using a hot pressing apparatus, it is sufficient that the pressure sintering may be performed, for example, in an atmosphere of argon, helium, neon, nitrogen, vacuum, or the like, at a temperature of 1400° C. or more and 1800° C. or less. The reason why the sintering temperature is set to be 1400° C. or more and 1800° C. or less is that if the temperature is lower than 1400° C., there is a possibility that the sintering may not be sufficiently performed. If the temperature exceeds 1800° C., the grains of alumina crystals and TiC crystals are remarkably grown, so that there is a possibility that the mechanical characteristics may largely be deteriorated in addition to the possibility that the surface roughness after the working cannot be decreased.

In the sintering step, in order to set the lattice constant of the TiC phase formed after the sintering in the range of 4.297 Å or more and 4.315 Å or less, the N$_2$ partial pressure or the O$_2$ partial pressure in the sintering atmosphere may be set in the range of 13 kPa to 90 kPa, thereby increasing the nitrogen amount and the oxygen amount taken into the sintered body.

When the pressure sintering is performed, a dense sintered body can be manufactured, and an AlTiC substrate with good strength can be obtained. After the pressure sintering step is performed as descried above, hot isostatic pressure (HIP) sintering may be additionally performed. For example, when the hot isostatic pressure sintering is performed by applying a pressure of 150 MPa or more and 200 MPa or less at a temperature of 1350° C. or more and 1700° C. or less, the flexural strength can be 700 MPa or more. Especially, in order to reduce the number of micropores, the HIP sintering may be performed at a temperature of 1500° C. or more and 1700° C. or less.

Figure 1A:
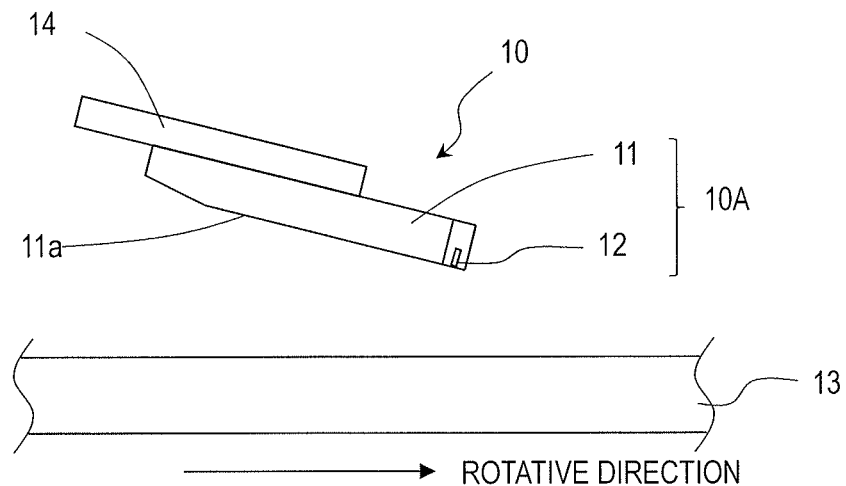
FIG. 1A and FIG. 1B are a side view and a perspective view of a magnetic head, respectively.
Figure 1B:
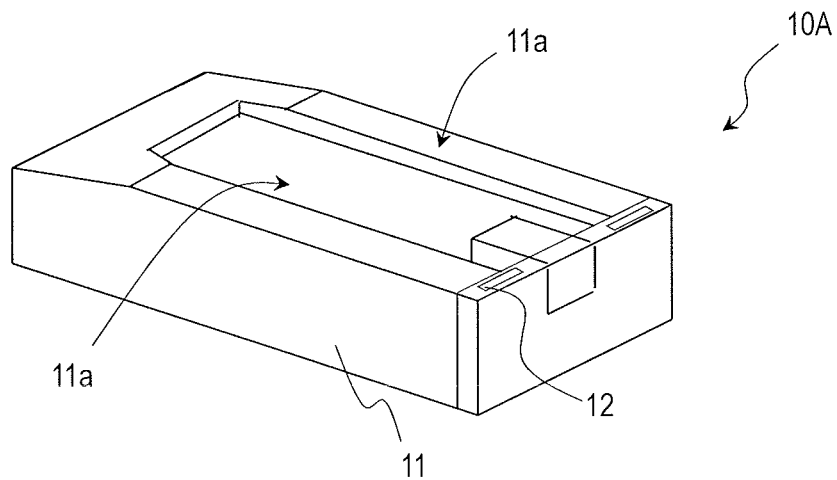
Figure 2A:
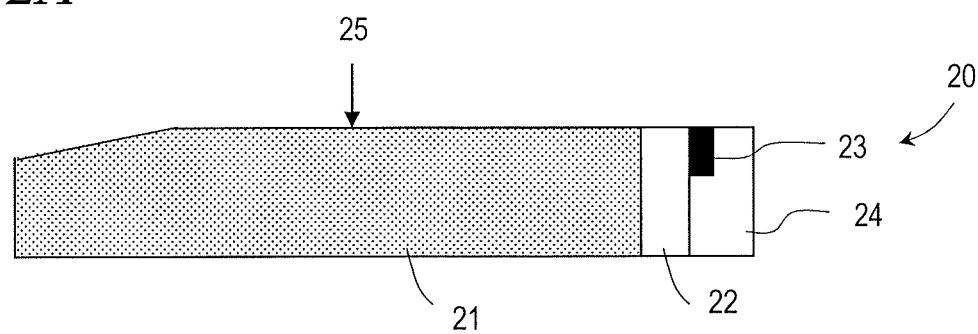
FIG. 2A and FIG. 2B are views showing a magnetic head in another embodiment.
Figure 2B:
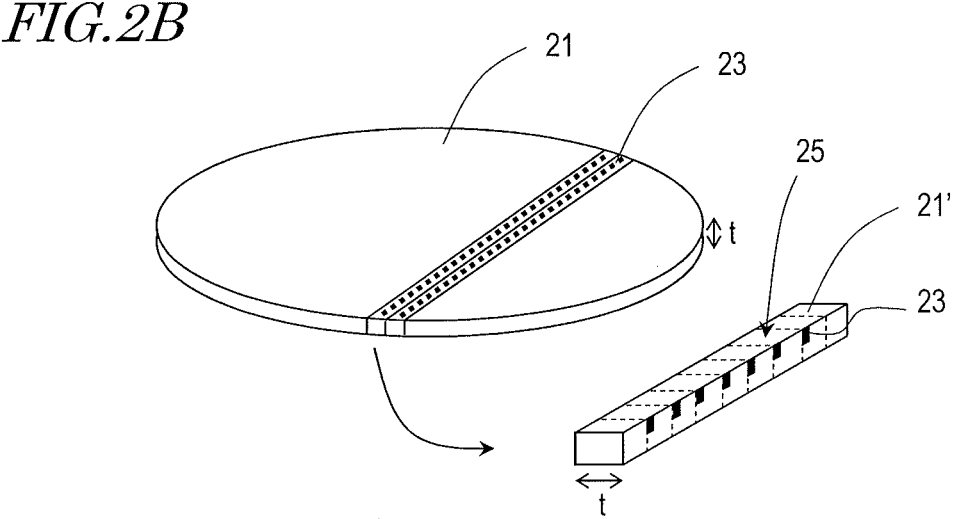

For the substrate surface of the AlTiC substrate, a plurality of devices, insulating films (such as an Al$_2$O$_3$ film) are formed via a known thin film depositing process. In addition, as shown in FIG. 2B, the AlTiC substrate 21 on which the transducer 23 is formed is cut into bars (row-bars) by using a dicing saw or the like, and then the cut surface (a side face perpendicular to the face on which the transducer 23 is formed) is subjected to lapping, thereby regulating the thickness and forming a smooth surface. In addition, by ion milling or the like, ABS suitable for the air flow in the smoothed surface is formed, and then cutting into chips is performed finally, thereby manufacturing a slider.

The ABS can be formed so as to have a desired shape by appropriately selecting processing conditions in the dry etching step such as ion milling or reactive ion etching. For example, in order to set the average roughness Ra of the ABS to be 25 nm or less, in the ion milling, it is sufficient that the ABS may be processed by setting the accelerating voltage to be 600 V, at a milling rate of 18 nm/minute with Ar ions for 75 to 125 minutes. In the reactive ion etching, it is sufficient that the ABS may be worked in the conditions where the flow rates of Ar gas and CF$_4$ gas are 3.4×10$^{-2}$ Pa·m$^3$/s and 1.7×10$^2$ Pa·m$^3$/s, respectively, and the pressure of mixed gas is 0.4 Pa.

Hereinafter the embodiments of the present invention and comparative examples will be described.

Table 1 shows samples with different composition ratios (mass %) of alumina powder, TiC powder, and TiO$_2$ powder as material powders, and different amounts of MgO powder as sintering aid (external pts·mass with total content of alumina powder, TiC powder, and TiO$_2$ powder as 100 pts·mass), as samples Nos. 1 to 27 of the embodiments according to the present invention, and samples Nos. 101 to 114 of comparative examples For respective samples, lattice constants in sintered bodies (c-axis lattice constants of alumina phase and lattice constants of TiC phase). In addition, as evaluation items, cutting workability (the number of bars) and lapped surface smoothness (nm). The lapped surface smoothness (nm) represents the average roughness Ra (nm) of the worked surface after the lapping step.

Herein the case where the number of cut bars is 30 or more until the cutting resistance reaches 0.4 kW is treated as a slider with superior productivity. Also, the case where the lapped surface smoothness is 1.5 nm or less is treated as a slider with good smoothness. As for a sample in which the cutting resistance reaches 0.4 kW before 30 bars are obtained by cutting, the number of cut bars at that time is shown in Table 1. The number "30" of bars corresponds to a standard dressing interval when the cutting is performed by using a dicing saw or the like. If the number of cut bars does not reach 30, the dressing is required relatively frequently, so that it is difficult to sufficiently improve the production speed.

In the range of diffraction angle of 2θ=20° to 80°, X-ray diffraction patterns obtained by the scanning of the step size of 0.017° and at the scan speed of 0.42°/sec are analyzed by using Rietveld analysis program of X'Pert High Score Plus by PANalytical, thereby obtaining lattice constants of the Al$_2$O$_3$ phase and the TiC phase. If necessary, for the obtained X-ray diffraction pattern, data processing such as Kα separation, background subtraction, or smoothing may be performed. By

TABLE 1

| Sample No. | Alumina material Lattice Constant (Å) | Material (Powder) | | | | Lattice Constant (Å) of Sintered body | | Evaluation items | |
|---|---|---|---|---|---|---|---|---|---|
| | | Al$_2$O$_3$ (mass %) | TiC (mass %) | TiO$_2$ (mass %) | MgO (out mass %) | Alumina phase | TiC phase | Cutting workability (the number of bars) | Lapped surface smoothness (nm) |
| 1 | 12.983 | 65.0 | 30.5 | 4.5 | 0.050 | 12.992 | 4.315 | 30 | 1.1 |
| 2 | 12.983 | 65.0 | 28.5 | 6.5 | 0.050 | 12.992 | 4.310 | 30 | 1 |
| 3 | 12.983 | 65.0 | 27.0 | 8.0 | 0.050 | 12.992 | 4.306 | 30 | 0.9 |
| 4 | 12.983 | 65.0 | 25.8 | 9.2 | 0.050 | 12.992 | 4.300 | 30 | 0.8 |
| 5 | 12.983 | 65.0 | 30.5 | 4.5 | 0.060 | 12.994 | 4.315 | 30 | 1.2 |
| 6 | 12.983 | 65.0 | 27.7 | 7.3 | 0.060 | 12.994 | 4.308 | 30 | 1 |
| 7 | 12.983 | 65.0 | 30.5 | 4.5 | 0.070 | 12.995 | 4.315 | 30 | 1.3 |
| 8 | 12.983 | 65.0 | 26.5 | 8.5 | 0.070 | 12.995 | 4.304 | 30 | 1 |
| 9 | 12.983 | 65.0 | 30.5 | 4.5 | 0.080 | 12.996 | 4.315 | 30 | 1.4 |
| 10 | 12.983 | 65.0 | 29.0 | 6.0 | 0.080 | 12.996 | 4.311 | 30 | 1.2 |
| 11 | 12.983 | 65.0 | 27.0 | 8.0 | 0.080 | 12.996 | 4.306 | 30 | 1 |
| 12 | 12.983 | 65.0 | 30.5 | 4.5 | 0.100 | 12.998 | 4.315 | 30 | 1.5 |
| 13 | 12.983 | 65.0 | 29.3 | 5.7 | 0.100 | 12.998 | 4.312 | 30 | 1.4 |
| 14 | 12.983 | 65.0 | 25.0 | 10.0 | 0.070 | 12.995 | 4.297 | 30 | 0.8 |
| 15 | 12.983 | 65.0 | 25.0 | 10.0 | 0.050 | 12.992 | 4.297 | 30 | 0.7 |
| 16 | 12.983 | 65.0 | 25.0 | 10.0 | 0.100 | 12.998 | 4.297 | 30 | 1.3 |
| 17 | 12.983 | 65.0 | 25.7 | 9.3 | 0.100 | 12.998 | 4.300 | 30 | 1.4 |
| 18 | 12.983 | 65.0 | 30.5 | 4.5 | 0.050 | 12.992 | 4.315 | 30 | 1 |
| 19 | 12.983 | 65.0 | 30.5 | 4.5 | 0.053 | 12.993 | 4.315 | 30 | 1 |
| 20 | 12.983 | 65.0 | 30.5 | 4.5 | 0.055 | 12.993 | 4.315 | 30 | 1 |
| 21 | 12.983 | 65.0 | 30.5 | 4.5 | 0.058 | 12.994 | 4.315 | 30 | 1.1 |
| 22 | 12.983 | 65.0 | 29.2 | 5.8 | 0.053 | 12.993 | 4.311 | 30 | 1 |
| 23 | 12.983 | 65.0 | 28.8 | 6.2 | 0.055 | 12.993 | 4.310 | 30 | 1 |
| 24 | 12.983 | 65.0 | 28.8 | 6.2 | 0.060 | 12.994 | 4.310 | 30 | 1 |
| 25 | 12.983 | 65.0 | 27.7 | 7.3 | 0.065 | 12.995 | 4.307 | 30 | 1 |
| 26 | 12.983 | 65.0 | 28.1 | 6.9 | 0.070 | 12.995 | 4.308 | 30 | 1 |
| 27 | 12.983 | 65.0 | 27.9 | 7.1 | 0.075 | 12.996 | 4.308 | 30 | 1 |
| Comparative 101 | 12.983 | 65.0 | 30.0 | 5.0 | 0.040 | 12.990 | 4.314 | 26 | 1 |
| Comparative 102 | 12.983 | 65.0 | 30.0 | 5.0 | 0.045 | 12.991 | 4.314 | 26 | 1 |
| Comparative 103 | 12.983 | 65.0 | 27.0 | 8.0 | 0.045 | 12.991 | 4.306 | 28 | 0.8 |
| Comparative 104 | 12.983 | 65.0 | 25.7 | 9.3 | 0.045 | 12.991 | 4.300 | 29 | 0.8 |
| Comparative 105 | 12.983 | 65.0 | 20.0 | 15.0 | 0.050 | 12.992 | 4.290 | 30 | 0.6 |
| Comparative 106 | 12.983 | 65.0 | 31.5 | 3.5 | 0.060 | 12.994 | 4.317 | 30 | 1.6 |
| Comparative 107 | 12.983 | 65.0 | 32.5 | 2.5 | 0.070 | 12.995 | 4.320 | 30 | 1.7 |
| Comparative 108 | 12.983 | 65.0 | 31.5 | 3.5 | 0.070 | 12.995 | 4.317 | 30 | 1.6 |
| Comparative 109 | 12.983 | 65.0 | 31.5 | 3.5 | 0.100 | 12.998 | 4.317 | 30 | 1.6 |
| Comparative 110 | 12.983 | 65.0 | 20.0 | 15.0 | 0.100 | 12.998 | 4.290 | 30 | 0.8 |
| Comparative 111 | 12.983 | 65.0 | 32.5 | 2.5 | 0.130 | 12.999 | 4.320 | 30 | 1.7 |
| Comparative 112 | 12.983 | 65.0 | 30.5 | 4.5 | 0.130 | 12.999 | 4.315 | 30 | 1.6 |
| Comparative 113 | 12.983 | 65.0 | 29.3 | 5.7 | 0.130 | 12.999 | 4.312 | 30 | 1.6 |
| Comparative 114 | 12.983 | 65.0 | 25.7 | 9.3 | 0.130 | 12.999 | 4.300 | 30 | 1.6 |

The examples Nos. 1 to 27, and the comparative examples Nos. 101 to 114 utilized alumina material powder which was closer to α-alumina having a corundum structure and of which the c-axis lattice constant was 12.983 Å. The alumina material powder having such a lattice constant may contain Na, Mg, Ca, or the like of about 10 to 800 ppm as impurity. It is noted that depending on the c-axis lattice constant of the alumina phase in the sintered body (the AlTiC substrate) varies.

The lattice constants in the respective samples of various compositions were measured by the following method. Specifically, 10 test pieces each having the size of about 30 mm×30 mm×1 mm are cut out from each sample. Each cut-out test piece is irradiated with Cu-target K-characteristic X-ray with tube voltage of 45 kV and tube current of 40 mA.

this method, measurement is performed at arbitrary ten points of each cut-out test piece, and an averaged value of 10 pieces× 10 points is calculated, thereby obtaining a lattice constant of respective sample.

The smoothness of the lapped surface (the average roughness Ra) is measured in the following way. After the sintered body of the AlTiC substrate is cut into row bars, and then the cut surface is subjected to lapping by a known general lapping method. The smoothness is measured in the lapped surface. The average roughness Ra in the lapped surface may be measured by a known general method.

Figure 4:
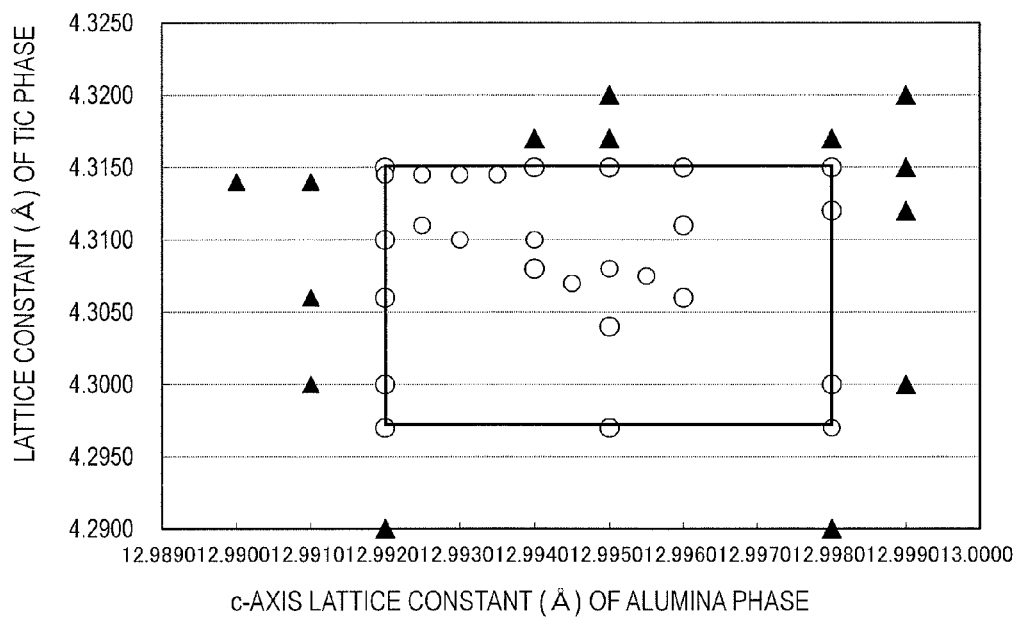
FIG. 4 is a diagram showing the distribution of embodiments of the present invention and comparative examples in which the c-axis lattice constants of the $Al_2O_3$ phase and the lattice constants of the TiC phase are different.

FIG. 4 shows the distribution of c-axis lattice constants of alumina phase and lattice constants of TiC phase for respective samples. In FIG. 4, the horizontal axis indicates the c-axis lattice constant of the alumina phase, and the vertical axis indicates the lattice constant of the TiC phase.

As known from Table 1 and FIG. 4, in the embodiments of the samples No. 1 to No. 27 in which the c-axis lattice constants of the alumina phases were in the range of 12.992 Å or more and 12.998 Å or less, and the lattice constants of the TiC phases were in the range of 4.297 Å or more and 4.315 Å or less, it was confirmed that the cutting workability was superior, and the smoothness of the lapped surface was also good. Although not shown in Table 1, in the samples No. 1 to No. 27, it was confirmed that a phase with a different etching rate (the third phase) other than the alumina phase and the TiC phase was not generated in the sintered body, and it was possible to prevent the degradation of surface roughness after the dry etching for forming the ABS. In addition, in the embodiments of the samples No. 1 to No. 27, it was confirmed that the lapping rate in the lapping step was good, so that the productivity could be improved.

Especially as shown in the embodiments of the samples Nos. 2 to 4, No. 6, No. 8, No. 11, No. 14, No. 15 and Nos. 23 to 27, in the case where the c-axis lattice constants of the alumina phases were in the range of 12.992 Å or more and 12.996 Å or less, and the lattice constants of the TiC phase were in the range of 4.297 Å or more and 4.310 Å or less, the smoothness of the lapped surface was 1 nm or less. Thus it could be confirmed that a lapped surface with superior smoothness was formed.

As shown in the comparative examples of the samples Nos. 101 to 105, in the case where the lattice constants of the TiC phase were in the range of 4.297 Å or more and 4.315 Å or less, it was confirmed that the smoothness of the lapped surface was superior, i.e. 1.0 nm or less. Accordingly, when the smoothness of the lapped surface is fairly important, the c-axis lattice constant of the alumina phase may be less than 12.992 Å, for example, in the range of 12.985 Å or more and less than 12.992 Å, in so far as the lattice constant of the TiC phase is in the range of 4.297 Å or more and 4.315 Å or less.

As for the samples No. 105 and No. 110 of the comparative examples, it was confirmed that both of the cutting workability and the lapped surface smoothness were good, but the surface roughness was remarkably deteriorated after the dry etching step for forming the ABS. It is considered that this is because when the lattice constant of the TiC phase is too low, a third phase with a different etching speed (for example, an $Al_2TiO_5$ phase) is formed in the sintered body. Accordingly, although not shown in Table 1, unlike the samples No. 1 to No. 27 of the embodiments, in the samples No. 105 and No. 110 of the comparative examples, it is confirmed that sufficient smoothness cannot be obtained for the ABS surface, so that it is not suitable for the use as a slider.

In the above description, the substrate for a thin-film magnetic head in the embodiment according to the present invention has been described. In addition, a hard disk drive device can be manufactured by a known method with a magnetic head slider manufactured by using the above-described substrate for the magnetic head.

Figure 5:
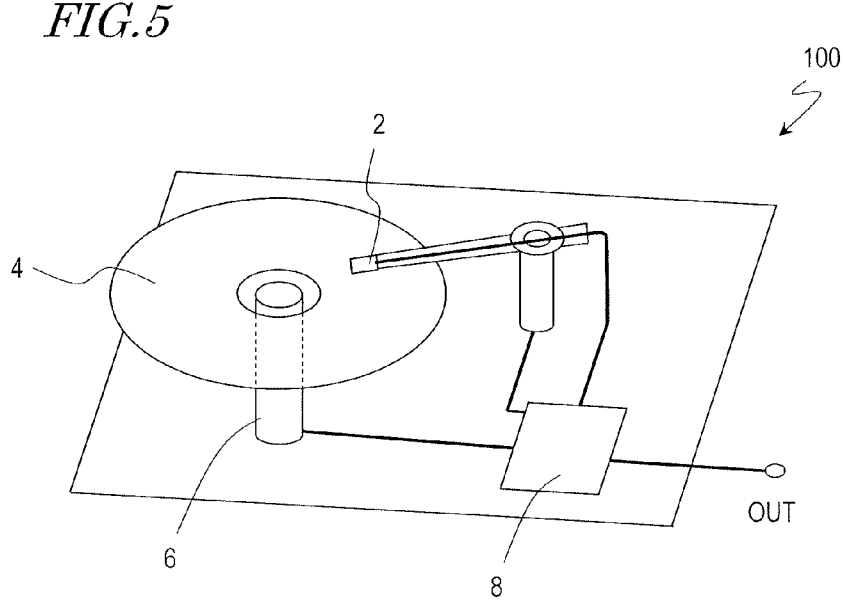
FIG. 5 is a schematic perspective view showing the configuration of a hard disk drive device in one embodiment of the present invention.

As shown in FIG. 5, a hard disk drive device 100 in an embodiment of the present invention includes, for example, a magnetic head slider 2 having the above-described configuration, a magnetic disk (a platter) 4, a motor 6 for causing the magnetic disk 4 to rotate, a controller 8 configured to control the positioning of the magnetic head slider 2 with respect to the magnetic disk 4 and control the writing/reading operation by the magnetic head slider 2, and the like. The controller 8 may be configured so that the head slider 2 is moved to a specific position on the platter 4 in response to the reading/writing signal from the external. In the hard disk drive device, it is possible to accurately maintain the gap between the magnetic head slider and the platter in the writing/reading operation in a very narrow condition. In addition, the occurrence of defect due to the TPTR can be prevented, so that the recording with high recording density can be realized.

The $Al_2O_3$—TiC based substrate for a thin-film magnetic head according to the embodiments of the present invention can be suitably used in a head slider used in a hard disk drive which realizes high recording density.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

This application is based on Japanese Patent Application No. 2014-134421 filed on Jun. 30, 2014, the entire contents of which are hereby incorporated by reference.

What is claimed is:

1. An $Al_2O_3$—TiC based substrate for a thin-film magnetic head including an $Al_2O_3$ phase and a TiC phase, wherein a c-axis lattice constant of the $Al_2O_3$ phase is 12.992 Å or more and 12.998 Å or less, and a lattice constant of the TiC phase is 4.297 Å or more and 4.315 Å or less.

2. The $Al_2O_3$—TiC based substrate for a thin-film magnetic head according to claim 1, wherein the c-axis lattice constant of the $Al_2O_3$ phase is 12.992 Å or more and 12.996 Å or less, and the lattice constant of the TiC phase is 4.297 Å or more and 4.310 Å or less.

3. A magnetic head slider comprising the $Al_2O_3$—TiC based substrate for a thin-film magnetic head recited in claim 1.

4. A hard disk drive device comprising the magnetic head slider recited in claim 3.

* * * * *